United States Patent [19]

Eguchi et al.

[11] Patent Number: 4,492,482
[45] Date of Patent: Jan. 8, 1985

[54] THERMAL HEAD DRIVING SYSTEM

[75] Inventors: Yasuhito Eguchi, Kanagawa; Izumi Kariya, Tokyo, both of Japan

[73] Assignee: Sony Corporation, Tokyo, Japan

[21] Appl. No.: 460,907

[22] Filed: Jan. 25, 1983

[30] Foreign Application Priority Data

Jan. 25, 1982 [JP] Japan .................................. 57-9656
Jan. 25, 1982 [JP] Japan .................................. 57-9657

[51] Int. Cl.$^3$ ...................... B41J 3/02; G01D 15/10
[52] U.S. Cl. .............................. 400/120; 346/76 PH; 219/216
[58] Field of Search .................. 400/120; 346/76 PH; 219/216 PH; 358/256, 298–299, 75, 78, 283, 79

[56] References Cited

U.S. PATENT DOCUMENTS

| | | | |
|---|---|---|---|
| 4,110,795 | 8/1978 | Spencer | 358/256 |
| 4,141,017 | 2/1979 | Henrion | 346/76 PH |
| 4,158,203 | 6/1979 | Johnson, Jr. et al. | 346/76 PH |
| 4,319,267 | 3/1982 | Mitsuya et al. | 358/75 |
| 4,334,231 | 6/1982 | Regehr | 346/76 PH |
| 4,335,968 | 6/1982 | Regnault | 400/120 |
| 4,364,063 | 12/1982 | Anno et al. | 346/76 PH |
| 4,378,566 | 3/1983 | Tsukamura | 346/76 PH |
| 4,389,935 | 6/1983 | Arai | 400/120 |
| 4,409,600 | 10/1983 | Minowa | 346/76 PH |
| 4,412,228 | 10/1983 | Moriguchi et al. | 346/76 PH |
| 4,415,907 | 11/1983 | Suemori | 346/76 PH |
| 4,423,424 | 12/1983 | Takayama | 346/76 PH |
| 4,475,908 | 11/1983 | Sugiura | 346/76 PH |

FOREIGN PATENT DOCUMENTS

| | | | |
|---|---|---|---|
| 18762 | 11/1980 | European Pat. Off. | 346/76 PH |
| 55-23466 | 2/1980 | Japan | 346/76 PH |
| 55-128478 | 10/1980 | Japan | 346/76 PH |
| 56-48103 | 3/1981 | Japan | 346/76 PH |
| 57-2771 | 1/1982 | Japan | 346/76 PH |

OTHER PUBLICATIONS

"Thermal Printhead Energization Circuit" IBM Technical Discl. Bulletin, vol. 24, No. 713 Dec. 1981 pp. 3968–3970.

Primary Examiner—E. H. Eickholt
Attorney, Agent, or Firm—Lewis H. Eslinger; Alvin Sinderbrand

[57] ABSTRACT

A thermal transfer printing system for printing data on a medium employing a plurality of aligned heat elements has a memory for receiving data and a driver for driving or energizing selected ones of the heat elements to print the stored data in a timed sequence which prevents preheating of certain heat elements. In one arrangement, upon driving the heat elements, every other heat element is first driven or energized to print the respective data, and then the remainder of the heat elements are driven. After all heat elements are energized according to the data to be printed, a stepping motor is actuated and the medium is advanced in preparation for printing a next line of data.

18 Claims, 12 Drawing Figures

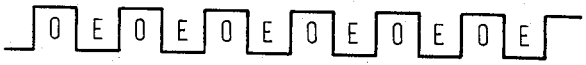
F I G. 5
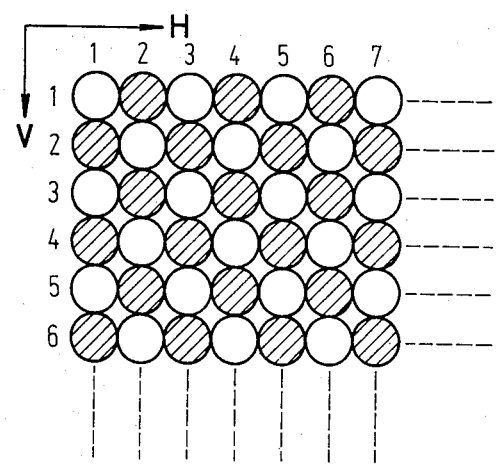

THERMAL HEAD DRIVING SYSTEM

BACKGROUND OF THE INVENTION

1. Field of the Invention

The present invention relates generally to a thermal transfer printer of the kind employing a ribbon carrying ink or pigment and, more particularly, to a system for driving the thermal head to print onto a record medium.

2. Description of the Prior Art

Thermal transfer printing apparatus is known that uses an inked or pigment-carrying ribbon to print a line of information or data at high speeds. These "line" printers have many applications apart from data processing applications, for example, a thermal head having 512 heat elements arranged in line can be used to copy a television image from a video signal by vertically scanning the video frame and using the thermal head to print the image onto a movable paper sheet. In that application, the thermal energy or heat needed to produce the image requires high electrical power levels in relation to the power requirements of the video processing circuitry and to the input power that is available. In order to meet these high power requirements it is known to arrange the heat elements of the thermal head so that they are electrically divided into a number of groups. Typically, in such thermal head arrangement, the groups of heat elements are sequentially driven in a time-sharing manner with respect to the power source, so that all heat elements are not energized simultaneously.

In the printing apparatus described above, the heat elements comprising the thermal head are divided into upper and lower groups (or first and second groups) relative to the longitudinal direction of the thermal head. The upper or first group of heat elements is driven or energized during a first heating cycle, and the lower or second group of heat elements is driven or energized during the next or second heating cycle. Depending on the length of the line to be printed and the particular power requirements, the thermal head can be divided into more than two groups of heat elements. The operation of the heat elements in the vicinity of the boundary between the groups presents a problem, because immediately after the upper group of heat elements is operated, "residual heat" is conducted to the lower group of heat elements, so that some of the heat elements in this second or lower group adjacent the upper group are preheated and/or additionally heated by heat from the upper groups. Thus, when the lower group is energized, various of the heat elements will get hotter than they would if the heat were due solely to the energization power. As a result, a stripe, or "overdeveloped" area is noticeable at the center of the printed image or at each interface between the groups of heating elements forming the head, thereby resulting in poor appearance and unacceptable print quality.

OBJECTS AND SUMMARY OF THE INVENTION

Therefore, it is an object of the present invention to provide a thermal head drive system that eliminates drawbacks in printing caused by residual heat in adjacent blocks of heat elements in the thermal head.

It is another object of the present invention to provide a thermal head drive system for forming a high quality printed image without irregular gradations, lines, or streaks in the final printed image.

A further object of the present invention is to provide a thermal head drive system employing digital circuitry to control the energization heat elements of the thermal head.

It is a still further object of the present invention to provide a thermal head drive system employing digital circuitry to store incoming data and to arrange the electrical connections of the heat elements of the thermal head so that adverse effects of residual heat are overcome.

In a thermal head drive system for a thermal printer according to an aspect of this invention the input data to be printed is stored in a memory and the thermal heat elements are divided into at least two groups, each group having its own drivers, with the groups being selectable so that some of the data is printed in a first group and subsequently the remainder of the data is printed in the second group. The groups are preferably chosen so that the heat elements in one group are interleaved in relation to the heat elements in the other group or groups, whereby the preheating problem is substantially eliminated. In one embodiment, the heating elements are divided into two groups comprised of the odd and even numbered heat elements in the printing head. This accomplishes the interleaving of the heating elements in a direct, uniform, alternating relationship.

The present invention also teaches to alternate the order of energization of the groups into which the head has been divided. For example, in printing a first line of data, the group of odd-numbered heat elements is first energized then the group of even-numbered heat elements is energized; and, in printing a second line of data, the group of even-numbered heat elements is first energized and the group of odd-numbered heat elements is then energized. This alternating energization pattern continues until all data has been printed.

The above, and other objects and advantages of the invention, will be apparent in the following detailed description of illustrative embodiments of the invention, which is to be read in connection with the accompanying drawings, wherein the same reference numerals are used to identify the same parts in the several views.

BRIEF DESCRIPTION OF THE DRAWINGS

FIGS. 4A to 4H are timing charts of signal waveforms for use in explaining the operation of the system shown in FIG. 3; and FIG. 5 is a detailed view of a fragment of a printed image, as produced by apparatus according to FIGS. 1 and 3.

DETAILED DESCRIPTION OF A PREFERRED EMBODIMENT

Figure 1:
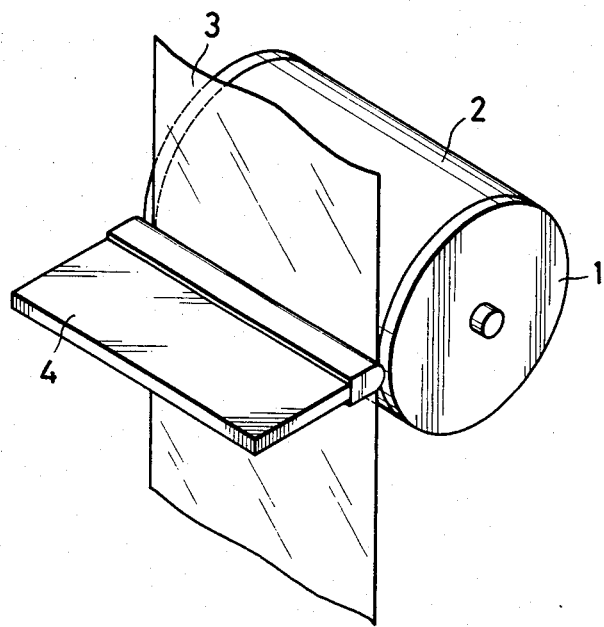
FIG. 1 is a perspective view showing the main part of the thermal transfer printing apparatus to which the present invention is applicable.
Figure 2:
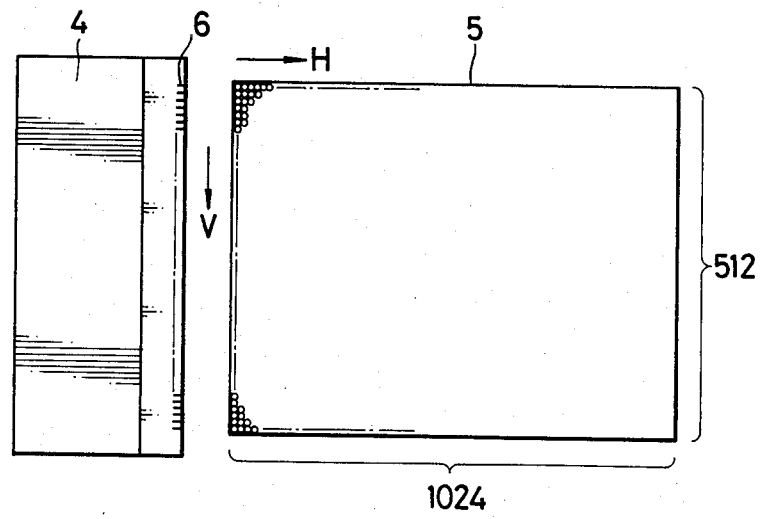
FIG. 2 is a plan view showing the thermal head and a printed image area.

FIG. 1 illustrates the basic operative elements of a thermal transfer printing apparatus to which the present invention is applicable, and in which a platen drum 1 is rotably mounted, and printing paper 2 is smoothly wound around platen drum 1. A suitable ink ribbon 3 is tangentially arranged or guided with respect to platen drum 1 and is maintained in close contact with platen drum 1 by means of a thermal head 4. As shown in FIG. 2, thermal head 4 has a plurality of heat elements 6 at its distal end, that is, at the edge adjacent platen drum 1, and, in this embodiment, 512 heat elements can be advantageously employed in thermal head 4. A sublimable dye or other thermally transferable pigment material is coated on ink ribbon 3. Ink ribbon 3 could alternately comprise a web of the kind utilized to accomplish color printing. Energization, or heating current, is selectively applied to heat elements 6 of thermal head 4 to print a selected pattern through ink ribbon 3 onto printing paper 2.

In this embodiment, a still image of a television signal is to be printed and, as shown in FIG. 2, the television frame or image 5 is divided into a number of picture elements (pixels) with 512 elements in the vertical direction and 1024 elements in the horizontal direction. It is this still image of a television signal formed as a 512 by 1024 array that is to be printed by means of thermal transfer head 4 onto paper 2.

Ink ribbon 3 is moved or advanced upon rotation of platen drum 1 so that a fresh dye or pigment layer is always adjacent thermal head 4 between the latter and paper 2 on platen drum 1. In operation, platen drum 1 is held stationary when the picture elements comprising one vertical line are printed. After the picture elements of the particular vertical line are printed by thermal head 4 onto paper 2, platen drum 1 is rotated, in a step-by-step fashion, by an amount equal to one column of picture elements in the horizontal direction, as indicated by arrow H in FIG. 2. Platen drum 1 is then ready for printing the next line of the video image on paper 2.

Figure 3:
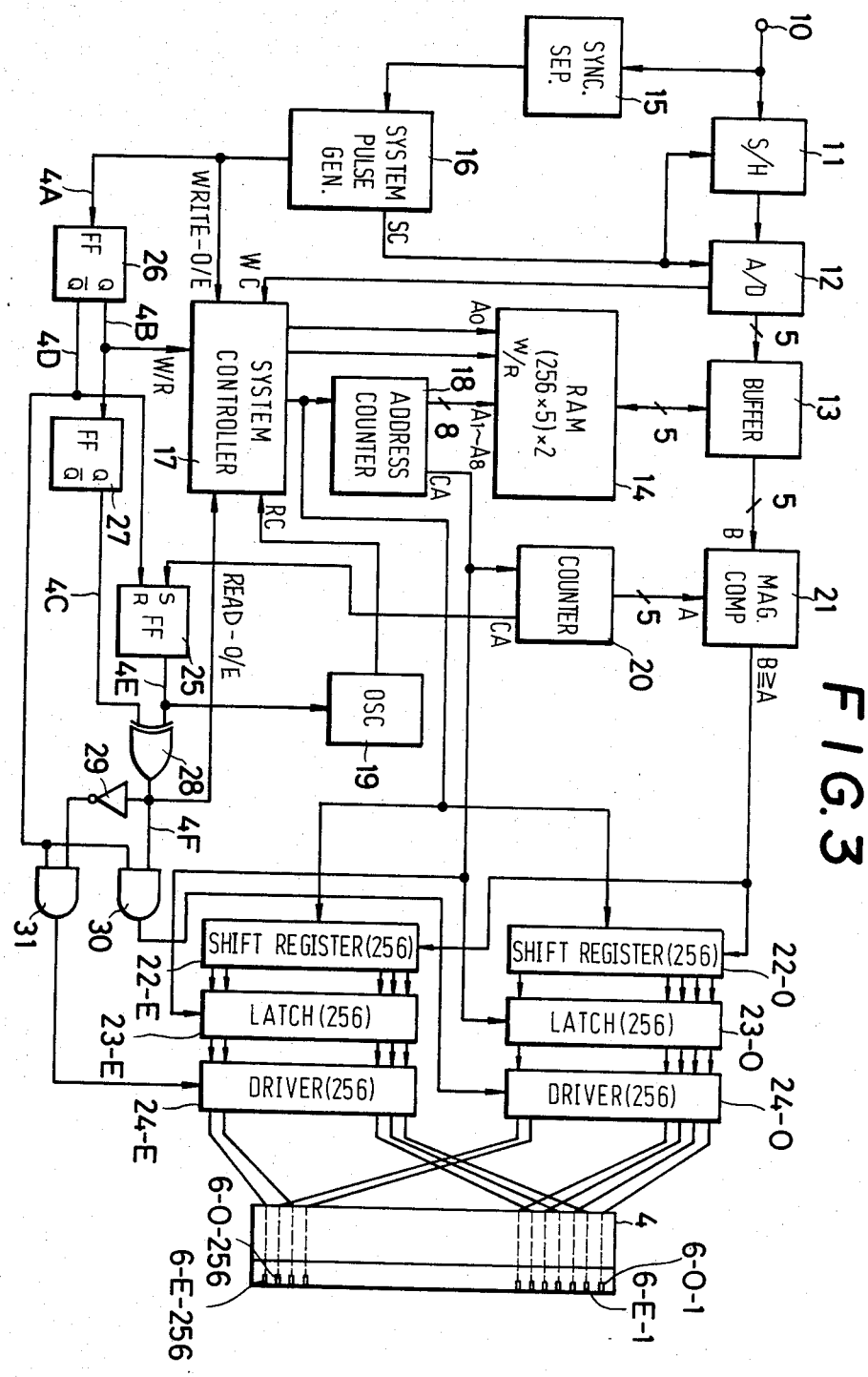
FIG. 3 is a schematic block diagram illustrating a thermal head drive system according to an embodiment of the present invention.

Referring now to FIG. 3, it will be seen that, in the thermal head drive system according to this invention, as there illustrated, an analog video signal representing a still image from a video sheet recorder or the like is supplied to an input terminal 10, and what may be thought of as one frame of an analog video signal representing the still image signal is fed through a sample and hold (S/H) circuit 11 to an analog-to-digital (A/D) converter 12. Analog-to-analog digital convertor 12 converts the serial analog signal into five lines of digital data, and these five lines of digital data are fed through a data buffer 13 and are written into a random access memory (RAM) 14.

The video signals, which make up one frame of video, are constituted of odd and even fields, as is known in the art, and are processed during every frame time so as to perform signal processing in units of vertical lines. A conventional television frame may be thought of as being made up of two fields of horizontal lines, which are typically distinguished by referring to one field of horizontal lines as the "odd" field and the other field of horizontal lines as the "even" field. Printing of the first frame is performed in the subsequent frame time. Now, assuming that one field has 256 effective lines, each analog sample of 256 lines per field will be converted into digital words of five bits each. Therefore, for the purpose of this example, RAM 14 must have a bit capacity of $256 \times 5 \times 2$ for containing the data of one frame. A sampling clock pulse, used for obtaining data, is generated by a system pulse generator 16 in accordance with a composite sync pulse obtained from the output video signal at terminal 10 by a sync pulse separator 15. The sampling clock pulse generated by system pulse generator 16 is supplied to sample and hold circuit 11 and to A/D converter 12. When A/D converter 12 completes the conversion coding of one data sample into digital code, it produces an end of coding signal (EOC) that is supplied as a write clock (WC) pulse to a system controller 17. In the write mode, system pulse generator 16 further generates an odd or even field identification signal (write-O/E) (FIG. 4A) which is fed to system controller 17.

The field identification signal (write-O/E) from system pulse generator 16 is also supplied to a flip-flop 26, where it is converted to a write/read pulse signal (W/R) (FIG. 4B), which is inverted after every frame, that is, after every two fields. When signal (W/R) is high, system controller 17 supplies a write signal to set RAM 14 in the "write" mode. The write mode is continued for two fields, that is, for one frame, so that segments of data corresponding to picture elements of $256 \times 2$ are stored in RAM 14. In the write mode, the end of code signal (EOC), or write clock (WC), produced by analog-to-digital converter 12 is fed through by system controller 17 as a clock pulse to an address counter 18, which then generates an eight-bit address signal ($A_1$–$A_8$) fed to RAM 14. In addition to the eight-bit address signal, a one-bit signal based on the odd or even field identification signal (write-O/E) is fed to RAM 14 as the least significant bit (LSB) ($A_0$). Thus, data having a total of nine bits is used to access the address of RAM 14.

During the immediately subsequent frame period, the print mode is initiated, so that data stored in RAM 14 are read out in response to a read clock pulse (RC) fed from an oscillator 19 and through system controller 17. Oscillator 19 is under the control of a flip-flop 25, as will be explained hereinbelow. The read clock pulse (RC) is counted by address counter 18 in the read operation and, at the same time, data having a total of nine bits, including a signal (read-O/E) as the LSB ($A_0$) are used to access the address of RAM 14. A gray scale counter 20 is arranged to receive a carry address signal (CA) from address counter 18. Gray scale counter 20 produces an output of five bits (32 gray scales) that is compared with data read out from RAM 14 through data buffer 13 in a magnitude comparator 21. The outputs from magnitude comparator 21 are supplied to shift registers 22-O and 22-E. Each of shift registers 22-O and 22-E has a capacity of 256 stages and is driven through system controller 17 by read clock pulse (RC) from oscillator 19. Outputs from shift register 22-O are supplied in parallel to odd-numbered heat elements 6-O-1 to 6-O-256 of thermal head 4 through a latch circuit 23-O and a driver array 24-O, which each comprise 256 individual places, respectively. Outputs from shift register 22-E are similarly supplied in parallel to even-numbered heat elements 6-E-1 to 6-E-256 through a latch circuit 23-E and a driver array 24-E, which again, each comprise 256 individual places, respectively. Data from the shift registers 22-O and 22-E are latched in latch circuits 23-O and 23-E, respectively, by a carry signal (CA) from address generator 18.

In the thermal transfer printing apparatus according to the present invention, flip-flop 25 is arranged to be in the SET condition upon reception of the carry signal from gray scale counter 20. An output signal (FIG. 4E) from flip-flop 25 is supplied to oscillator 19 to control the frequency of the read-clock pulses (RC) and the output from flip-flop 25 is also supplied to one input of an exclusive OR gate 28. An output signal (FIG. 4C)

from a flip-flop 27 is supplied to the other input of exclusive OR gate 20A. Flip-flop 27 is triggered by the Q output from flip-flop 26 and generates a pulse (FIG. 4C) that is inverted after every two frames, that is, after every four fields. An output (FIG. 4F) from exclusive OR gate 28 is supplied, as the odd-even field identification signal (read-O/E) in the read mode, to system controller 17 and is also fed to one input of an AND gate 30. The (read-E/O) signal in the read mode is supplied from exclusive OR gate to one input of an AND gate 31 through an inverter 29, and a Q output (FIG. 4D) from flip-flop 26 is supplied to the other input of each of AND gates 30 and 31 and also resets flip-flop 25. The Q output of flip-flop 26 goes high when the system performs the printing operation. This signal is also used to reset flip-flop 25. An output signal (FIG. 4G) from AND gate 30 is fed to driver array 24-O and the corresponding output signal (FIG. 4H) from AND gate 31 is supplied to driver array 24-E. Such output signals (FIGS. 4G and 4H) from AND gates 30 and 31 enable the respective drivers to energize selected heat elements of thermal head 4.

As may be apparent from the operation as described above, thermal head 4 is driven or energized in the order of heat elements 6-O first and heat elements 6-E second, in printing the first vertical line of the video frame. In printing the second vertical line of the same video frame, thermal head 4 is driven in the reverse order, that is, heat elements 6-E are energized first and heat elements 6-O are energized second. In the printing operation, the signal (read-O/E) is used as the least significant bit ($A_0$) in reading out the data stored in RAM 14, which is instructed to be in the read mode by a read signal fed thereto from system controller 17.

As described above, a frame store memory, such as a video sheet recorder, is utilized to print the video image in this embodiment. For example, a still image obtained by the video sheet recorder is supplied to input terminal 10 and the signal is stored in RAM 14 for the first two-field period (one frame), so as to print the still image signal in the second two-field period (one frame). In the third two-field period, the still video signal on the next line is read into and stored in RAM 14 and, at the same time, platen drum 1 is advanced by one step in the horizontal line direction. Note that during the print cycle, platen drum 1 is prevented from rotating, therefore, a two frame period (four field periods) is required to read in and print out one vertical line. If 1024 picture elements are present in the horizontal direction (see FIG. 2), an entire video picture can be printed in a time period given by $4 \times 1024$ fields.

In this embodiment, the television frame signal is classified or arranged into odd field signal components and even field signal components, all of which are written into RAM 14. In the data fetch cycle of RAM 14, which corresponds to a write command, the signal (write-O/E) is set at logic level "1" in the odd field, and this corresponds to the least significant bit of the address ($A_0$) of RAM 14. Conversely, the (write-O/E) signal is set at logic level "0" in the even field. When the data fetch cycle, which involves both fields, is completed, the print cycle is then started.

In this embodiment, pulse width modulation (PWM) control is performed to obtain an image of up to 32 gray scales, depending upon the kin of video signal involved. Since the video signal in this embodiment is converted to five-bit data by A/D converter 12, the gray scale counter 20 also produces five-bit reference data for comparison therewith. At the first gray scale level, represented for example by "00000", the 256 bits of data that have been stored in RAM 14 are compared with the five bits of data from counter 20 in magnitude comparator 21. The results of these comparisons are sequentially stored in shift register 22-O. In an example using the apparatus of FIG. 3, the (read-O/E) signal is set at logic level "1", thus the least significant bit ($A_0$) is also set at logic level "1" and the 256 bits of data stored in RAM 14 are all compared with a gray scale level, for example, "00001", with the results of the comparison being sequentially stored in shift register 22-O. The contents previously stored in the 256-place shift register 22-O are fetched and latched into the 256-place latch circuit 23-E in response to a carry address (CA) signal from address counter 18, and are used to drive or energize the odd-numbered heat elements 6-O-1 to 6-O-256 through their respective driver array 24-O. Shift register 22-E and latch circuit 23-E are operated in the same manner as shift register 22-O and latch circuit 23-O, respectively. However, because an enabling pulse has not been supplied to driver array 24-E, the even-numbered heat elements 6-E-1 to 6-E-256 are not driven or energized. In the above gray scale check, magnitude comparator 21 produces a signal of logic level "1" when it receives two inputs A and B from counter 20 and buffer 13, respectively, and input A is greater than or equal to input B. What is actually being accomplished here is a pulse width modulation operation in accordance with the gray scale level. An example of this pulse width modulation process is described in detail in co-pending U.S. Pat. application Ser. No. 403,795, filed July 30, 1982 and having a common assignee herewith.

In the operation of the above-described embodiment, when it is desired to record the first vertical line, the odd-numbered heat elements of the thermal head 4 are driven, then the even-numbered heat elements of the thermal head 4 are driven and, for the second vertical line, the even-numbered heat elements of the thermal head 4 are driven first and then the odd-numbered heat elements are driven. The switching of the heat elements to be driven is controlled by enabling pulses from the outputs of AND gates 30 and 31. The addressing of RAM 14 is controlled by the signal (read-O/E) from exclusive OR gate 28. It may be noted that, in the apparatus of FIG. 3, the output from flip-flop 25 is used to control the frequency of oscillation of oscillator 19, and this controls the read clock signal (RC) fed to system controller 17. As is known, when the odd-numbered heat elements are energized, the temperature of the even-numbered heat elements will be slightly increased due to the close physical proximity of the odd-numbered and even-numbered elements to each other. If when the even numbered heat elements are being driven or energized, the same current level and duty cycle are used as when the odd-numbered heat elements are driven or energized, then some of the even-numbered elements, which may have already been heated by "residual heat", will become overheated. In order to eliminate this overheating problem and the attendant degradation of the printed copy, as described hereinabove, the frequency of oscillation of the signal from oscillator 19 is slightly increased so that the heat elements (either even-numbered or odd-numbered) heated during the second heating are heated for a period slightly shorter than the period within which the first heating cycle was performed. It has been found that particularly advantageous results are obtained when the ratio of the period of the first heating cycle to the period of the second heating cycle is approximately 10:9.

The quality of the video image printed by a gray scale printer can be improved by the heat sequence control and the heat time control, as described above. A representation of the printed picture elements is shown in FIG. 5, wherein each white circle indicates a printed pattern element produced by a heat element driven or energized in the first printing cycle, and in which a hatched circle indicates a printed pattern produced by the heat elements driven in the second printing cycle. In this case, the pulse width of the heat drive pulses supplied to the head 4 to print the hatched circles is shorter than that of the heat drive pulse applied to head 4 to print the open or white circles.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for thermally printing data onto a medium, comprising:
    thermal head means having a first group of heat elements and a second group of heat elements arranged in interleaved relationship with said first group and in which all of said heat elements are arranged in a line;
    memory means for storing data consisting of a plurality of separate data points to be printed by said thermal head means;
    first driving means receiving alternate ones of said plurality of separate data points from said memory means and connected to said first group of heat elements comprising every other heat element of said thermal head means;
    second driving means receiving the remaining ones of said plurality of separate data points from said memory means and connected to said second group of heat elements comprising the remaining ones of said heat elements of said thermal head means; and
    means for selectively sequentially activating said first and second driving means, whereby said every other ones of said plurality of separate data points are printed simultaneously by said first group of heat elements during a first time period and said remaining ones of said plurality of separate data points are printed simultaneously by said second group of heat elements during a second time period that does not overlap said first time period.

2. An apparatus for thermally printing data according to claim 1; in which said first and second driving means include respectively first and second shift register means each connected for receiving stored data from said memory means.

3. An apparatus for thermally printing data according to claim 1; in which said first and second driving means further include respective first and second latch means electrically arranged between said first shift register means and said first and second driving means and between said second shift register means and second driving means, respectively.

4. An apparatus for thermally printing data according to claim 1; in which said means for selectively activating said first and second driving means comprises means for alternating the order in which said first and second driving means drive the corresponding heat elements.

5. An apparatus for thermally printing data according claim 1; in which said means for selectively activating said first and second driving means comprises timing means for selectively controlling the length of time of driving said selected ones of said heat elements.

6. An apparatus for thermally printing data according to claim 1; in which said means for selectively activating said first and second driving means includes timing means for controlling the lengths of time said first and second groups of heat elements are respectively driven, and in which said second group of heat elements is driven for a time less than the time during which said first group of heat elements is driven.

7. An apparatus for thermally printing data according to claim 1; further comprises gray scale comparator means for comparing said stored data with preselected gray scale values for weighing said data based on said comparison.

8. An apparatus for thermally printing data according to claim 1; in which said data is input as serial data and further comprising analog-to-digital convertor means for arranging said serial data into parallel data fed to said memory means.

9. An apparatus for thermally printing data onto a medium, comprising:
    thermal head means having a plurality of heat elements arranged substantially in a line, said thermal head means including first and second groups of heat elements, the heat elements of said groups being mutually interleaved one with another;
    storage means for storing data to be printed;
    driver means for driving said heat elements to print said data onto said medium; and
    means for selecting sequentially said first group of heat elements made up of odd-numbered heat elements in said line to be driven simultaneously by said driver means during a first time period and said second group of heat elements made up of even-numbered heat elements in said line to be driven simultaneously by said driver means during a second time, separate from an in non-overlapping time relationship with said first time period.

10. An apparatus for thermally printing data according to claim 9; further comprising means for controlling the respective lengths of said first time and said second time, during which said first and second groups of heat elements are driven by said driver means.

11. An apparatus for thermally printing data according to claim 10; in which said means for controlling the length of time said first and second groups of heat elements are driven includes means establishing said second time to be less than said first time.

12. An apparatus for thermally printing data according to claim 9; in which said driver means comprises first and second driver means, said first driver means is arranged for driving every other one of said heat elements and said second driver means is arranged for driving the remaining ones of said heat elements, whereby said data is printed on said medium sequentially during said first time and said second time.

13. An apparatus for thermally printing data according to claim 12; further comprising first and second shift register means for receiving data stored in said storage means and feeding the same to said first and second driver means, respectively.

14. An apparatus for thermally printing data according to claim 13; further comprising first and second latch means electrically arranged between said first shift register and first driver means, and between said second shift register and second driver means, respectively.

15. An apparatus for thermally printing data according to claim 9; in which said means for selecting includes means for alternating the order in which said first and second times occur.

16. An apparatus for thermally printing data according to claim 15; in which said means for selecting includes means for controlling the respective lengths of said first and second times during which said first and second groups of heat elements are respectively driven whereby a subsequently driven group is driven for a lesser time than an initially driven group.

17. An apparatus for thermally printing data according to claim 9; further comprising gray scale comparison means for comparing said stored data with predetermined gray scale values and weighting said stored data based on said comparison.

18. An apparatus for thermally printing data according to claim 9; in which said stored data represents a frame of a video signal.

* * * * *